US011969100B2

(12) United States Patent
Wagner et al.

(10) Patent No.: US 11,969,100 B2
(45) **Date of Patent: *Apr. 30, 2024**

(54) DYNAMIC FOAM MATTRESS ADAPTED FOR USE WITH A VARIABLE LENGTH HOSPITAL BED

(71) Applicant: Hill-Rom Services, Inc., Batesville, IN (US)

(72) Inventors: Catherine Wagner, Osgood, IN (US); Darrell Borgman, Batesville, IN (US); Travis Pelo, Batesville, IN (US); Douglas E. Borgman, Batesville, IN (US); Kelsey G. Eikens, Maineville, OH (US)

(73) Assignee: Hill-Rom Services, Inc., Batesville, IN (US)

(*) Notice: Subject to any disclaimer, the term of this patent is extended or adjusted under 35 U.S.C. 154(b) by 409 days.

This patent is subject to a terminal disclaimer.

(21) Appl. No.: 17/347,078

(22) Filed: Jun. 14, 2021

(65) Prior Publication Data

US 2021/0298488 A1 Sep. 30, 2021

Related U.S. Application Data

(63) Continuation of application No. 16/038,253, filed on Jul. 18, 2018, now Pat. No. 11,033,117.

(Continued)

(51) Int. Cl.
*A47C 27/08* (2006.01)
*A47C 27/10* (2006.01)
(Continued)

(52) U.S. Cl.
CPC ............ *A47C 27/088* (2013.01); *A47C 27/10* (2013.01); *A61G 7/005* (2013.01); *A61G 7/015* (2013.01);
(Continued)

(58) Field of Classification Search
CPC ....... A47C 27/088; A47C 27/10; A47C 27/14; A61G 7/05776; A61G 7/05784;
(Continued)

(56) References Cited

U.S. PATENT DOCUMENTS

| | | | |
|---|---|---|---|
| 4,644,597 | A | 2/1987 | Walker |
| 4,679,264 | A | 7/1987 | Mollura |

(Continued)

FOREIGN PATENT DOCUMENTS

| | | | | |
|---|---|---|---|---|
| EP | 3434246 | A1 * | 1/2019 | A47C 27/088 |
| EP | 3434246 | B1 * | 5/2021 | A47C 27/088 |

(Continued)

OTHER PUBLICATIONS

European Search Report, Application No. EP18185828.3-1113, dated Dec. 20, 2018, 9 pages.

(Continued)

*Primary Examiner* — Robert G Santos
(74) *Attorney, Agent, or Firm* — Barnes & Thornburg LLP

(57) ABSTRACT

A non-powered mattress including a cover enclosing a frame structure and a bladder assembly, the cover adapted to engage an articulated frame to control movement of portions of the foam frame and the bladder assembly in response to movement of the articulated frame.

20 Claims, 10 Drawing Sheets

Related U.S. Application Data

(60) Provisional application No. 62/537,943, filed on Jul. 27, 2017.

(51) Int. Cl.

| | |
|---|---|
| ***A47C 27/14*** | (2006.01) |
| ***A61G 7/005*** | (2006.01) |
| ***A61G 7/012*** | (2006.01) |
| ***A61G 7/015*** | (2006.01) |
| ***A61G 7/05*** | (2006.01) |
| ***A61G 7/057*** | (2006.01) |

(52) U.S. Cl.
CPC ..... *A61G 7/05715* (2013.01); *A61G 7/05769* (2013.01); *A47C 27/14* (2013.01); *A61G 7/012* (2013.01); *A61G 7/0514* (2016.11); *A61G 2200/56* (2013.01); *A61G 2203/74* (2013.01)

(58) Field of Classification Search
CPC .... A61G 7/008; A61G 7/05715; A61G 7/015; A61G 7/05769; A61G 7/005; A61G 7/0514; A61G 7/1012; A61G 2203/74; A61G 2200/56
See application file for complete search history.

(56) References Cited

U.S. PATENT DOCUMENTS

| | | | | |
|---|---|---|---|---|
| 5,142,717 | A | 9/1992 | Everard et al. | |
| 5,634,224 | A | 6/1997 | Gates | |
| 5,652,985 | A | 8/1997 | Wilkinson et al. | |
| 5,699,570 | A | 12/1997 | Wilkinson et al. | |
| 6,564,411 | B2 | 5/2003 | Pirzada | |
| 6,611,979 | B2 | 9/2003 | Welling et al. | |
| 6,684,434 | B2 | 2/2004 | Ellis et al. | |
| 6,694,556 | B2 * | 2/2004 | Stolpmann | A47C 27/088 5/709 |
| 7,213,279 | B2 | 5/2007 | Ulrich et al. | |
| 7,434,283 | B2 * | 10/2008 | Wilkinson | A47C 27/10 5/713 |
| 7,520,006 | B2 | 4/2009 | Venderpohl, III et al. | |
| 7,886,386 | B2 | 2/2011 | Balonick et al. | |
| 8,196,240 | B2 | 6/2012 | Meyer et al. | |
| 8,261,387 | B2 * | 9/2012 | Lipman | A47C 27/084 5/709 |
| 8,286,282 | B2 | 10/2012 | Smith et al. | |
| 8,789,224 | B2 * | 7/2014 | Wyatt | A61G 7/05776 5/713 |
| 9,271,579 | B2 | 3/2016 | Riley et al. | |
| 9,314,118 | B2 * | 4/2016 | Blazar | A47G 9/1027 |
| 9,820,904 | B2 | 11/2017 | Lafleche et al. | |
| 10,182,954 | B2 | 1/2019 | Wilkinson et al. | |
| 11,033,117 | B2 * | 6/2021 | Wagner | A47C 27/088 |
| 2002/0116766 | A1 | 8/2002 | Stolpmann | |
| 2004/0031103 | A1 * | 2/2004 | Wyatt | A47C 27/088 5/710 |
| 2004/0222684 | A1 | 11/2004 | Vansickle | |
| 2005/0125905 | A1 | 6/2005 | Wilkinson | |
| 2005/0177952 | A1 | 8/2005 | Wilkinson et al. | |
| 2006/0026765 | A1 | 2/2006 | Hornbach et al. | |
| 2007/0186349 | A1 * | 8/2007 | Lipman | A47C 27/084 5/709 |
| 2008/0028534 | A1 | 2/2008 | Wilkinson | |
| 2010/0090383 | A1 | 4/2010 | Rawls-Meehan | |
| 2010/0146709 | A1 | 6/2010 | Lafleche et al. | |
| 2012/0065560 | A1 | 3/2012 | Siegner | |
| 2012/0144595 | A1 | 6/2012 | Hornbach et al. | |
| 2013/0019409 | A1 | 1/2013 | Blazar et al. | |
| 2013/0219626 | A1 | 8/2013 | Clapper | |
| 2013/0340168 | A1 | 12/2013 | Meyer et al. | |
| 2014/0259432 | A1 | 9/2014 | Gowda et al. | |
| 2014/0310881 | A1 * | 10/2014 | Wyatt | A61G 7/0525 5/709 |
| 2018/0064593 | A1 | 3/2018 | Chiacchira et al. | |
| 2019/0029439 | A1 * | 1/2019 | Wagner | A61G 7/05776 |
| 2021/0298488 | A1 * | 9/2021 | Wagner | A61G 7/005 |

FOREIGN PATENT DOCUMENTS

| | | | |
|---|---|---|---|
| EP | 3892248 | A1 * | 10/2021 |
| WO | 0238099 | A2 | 5/2002 |
| WO | 2007095263 | A2 | 8/2007 |
| WO | 2010058158 | A1 | 5/2010 |
| WO | 2013164687 | A1 | 11/2013 |
| WO | 2014080196 | A2 | 5/2014 |

OTHER PUBLICATIONS

Official Action in related CN201810847857.5, dated Jul. 30, 2020, 8 pages.
Official Action in related JP 2021-068323, dated Jun. 6, 2023, 3 pages.
European Search Report, Application No. EP21169221.5-1113, dated Dec. Sep. 13, 2021, 11 pages.

* cited by examiner

DYNAMIC FOAM MATTRESS ADAPTED FOR USE WITH A VARIABLE LENGTH HOSPITAL BED

PRIORITY CLAIM

This application is a continuation of U.S. patent application Ser. No. 16/038,253, filed Jul. 18, 2018, now issued as U.S. Pat. No. 11,033,117, which claims priority under 35 U.S.C. § 119(e) to U.S. Provisional Application No. 62/537,943, filed Jul. 27, 2017, each of which are expressly incorporated by reference herein.

TECHNICAL FIELD

The present disclosure relates to mattresses for use in a clinical environment. More specifically, the present disclosure relates to non-powered mattresses that use self-adjusting technology to control the interface pressure applied at the surface of the mattress when a patient is positioned on the surface.

BACKGROUND

As hospital beds frames and other patient support apparatuses include more advanced and include advanced articulation to allow for better customized adjustment and positioning of patient's, the support surfaces/mattresses support on the frames are placed in ever increasingly complex positions. Relative movement of the components of the mattress relative to the frame can result in the mattress components being improperly positioned relative to the patient. In some cases, internal components are displaced within the cover of the mattress, causing a decrease in the performance of the mattress.

SUMMARY

The present disclosure includes one or more of the features recited in the appended claims and/or the following features which, alone or in any combination, may comprise patentable subject matter.

According to a first aspect of the present disclosure, a patient support apparatus comprises a foam frame, a bladder assembly, and a cover. The foam frame defines a space. The bladder assembly is positioned in the space. The bladder assembly includes a plurality of foam-filled bladders, each of the foam filled bladders interconnected by a manifold and having a relief valve to release air from the bladder assembly if the pressure in the bladder assembly exceeds a predetermined limit. The cover encloses the frame structure and the bladder assembly and is adapted to engage an articulated frame to control movement of portions of the foam frame and the bladder assembly in response to movement of the articulated frame.

In some embodiments, the cover includes a plurality of protrusions extending from a bottom surface of the cover, the protrusions adapted to be received in receivers formed in portions of the articulated frame to secure the cover to the articulated frame at a plurality of points.

In some embodiments, at least one of the protrusions is secured to the foam frame and a second at least one of the protrusions is secured to the bladder assembly and the second at least one protrusion not secured to the cover.

In some embodiments, the bladder assembly is secured to the cover at a second location spaced apart from a protrusion.

In some embodiments, the cover is configured to include pockets that receive a portion of the bladder assembly to secure the bladder assembly to the cover at the second location.

In some embodiments, the bladder assembly includes a plate that floats relative to the remainder of the bladder assembly, the plate interconnecting the bladder assembly and cover at the second location.

In some embodiments, the bladder assembly includes a sleeve formed in bladder assembly cover and the plate is positioned in the sleeve and moveable relative thereto.

In some embodiments, the plate is semi-rigid but sufficiently pliable to be positioned in the pockets.

In some embodiments, the second protrusion is secured to the bladder cover.

In some embodiments, the first protrusion is connected to a plate secured to the foam frame.

In some embodiments, the plate is secured to the foam frame by a sleeve such that the plate floats within the sleeve.

In some embodiments, the sleeve is secured to the foam frame by glue.

In some embodiments, the foam frame includes a perforated foot section that is variable in length.

According to a second aspect of the present disclosure, a patient support apparatus comprises a foam frame defining a space; a bladder assembly positioned in the space, and a cover enclosing the frame structure and the bladder assembly. The bladder assembly includes a plurality of foam-filled bladders. Each of the foam filled bladders is interconnected by a manifold. The manifold has an unpowered relief valve configured to release air from the bladder assembly if the pressure in the bladder assembly exceeds a predetermined limit of the relief valve. The cover encloses the frame structure and the bladder assembly and is adapted to engage an articulated frame to control movement of portions of the foam frame and the bladder assembly in response to movement of the articulated frame.

In some embodiments, the cover may include a plurality of protrusions extending from a bottom surface of the cover, the protrusions adapted to be received in receivers formed in portions of the articulated frame to secure the cover to the articulated frame at a plurality of points.

In some embodiments, at least one of the protrusions may be secured to the foam frame and a second at least one of the protrusions may be secured to the bladder assembly and the second at least one protrusion not secured to the cover.

In some embodiments, the bladder assembly may be secured to the cover at a second location spaced apart from a protrusion.

In some embodiments, the cover may be configured to include pockets that receive a portion of the bladder assembly to secure the bladder assembly to the cover at the second location.

In some embodiments, the bladder assembly may include a plate that floats relative to the remainder of the bladder assembly and the plate may interconnect the bladder assembly and cover at the second location.

In some embodiments, the bladder assembly may include a sleeve formed in bladder assembly cover and the plate may positioned in the sleeve and moveable relative thereto.

In some embodiments, the plate may be semi-rigid but sufficiently pliable to be positioned in the pockets.

In some embodiments, the second protrusion may be secured to the bladder cover.

In some embodiments, the first protrusion may be connected to a plate secured to the foam frame.

In some embodiments, the plate may be secured to the foam frame by a sleeve such that the plate floats within the sleeve.

In some embodiments, the sleeve may be secured to the foam frame by glue.

In some embodiments, the foam frame may include a perforated foot section that is variable in length.

In some embodiments, the foam-filled bladders each may include a first layer and a second layer.

In some embodiments, a first group of the plurality of foam-filled bladders may have a first performance. A second group of foam-filled bladders may have a second performance, different from the first performance. In some embodiments the difference in performance may vary the support for a patient supported on the patient support apparatus between a head portion and a torso portion of the patient support apparatus.

In some embodiments, each of the bladders may include a transparent window formed in a wall of an enclosure of the bladder.

In some embodiments, the performance of a particular bladder may be color coded and the transparent window may be positioned to allow a user to identify the color of the bladder to identify the performance of the particular bladder by associating the color.

In some embodiments, some of the plurality of foam-filled bladders may include an unpowered check valve configured to open and permit atmospheric air to enter the respective bladder if the pressure in the bladder assembly is lower than the pressure of atmospheric air.

Additional features, which alone or in combination with any other feature(s), such as those listed above and/or those listed in the claims, can comprise patentable subject matter and will become apparent to those skilled in the art upon consideration of the following detailed description of various embodiments exemplifying the best mode of carrying out the embodiments as presently perceived.

BRIEF DESCRIPTION OF THE DRAWINGS

The detailed description particularly refers to the accompanying figures in which.

DETAILED DESCRIPTION

Figure 1:
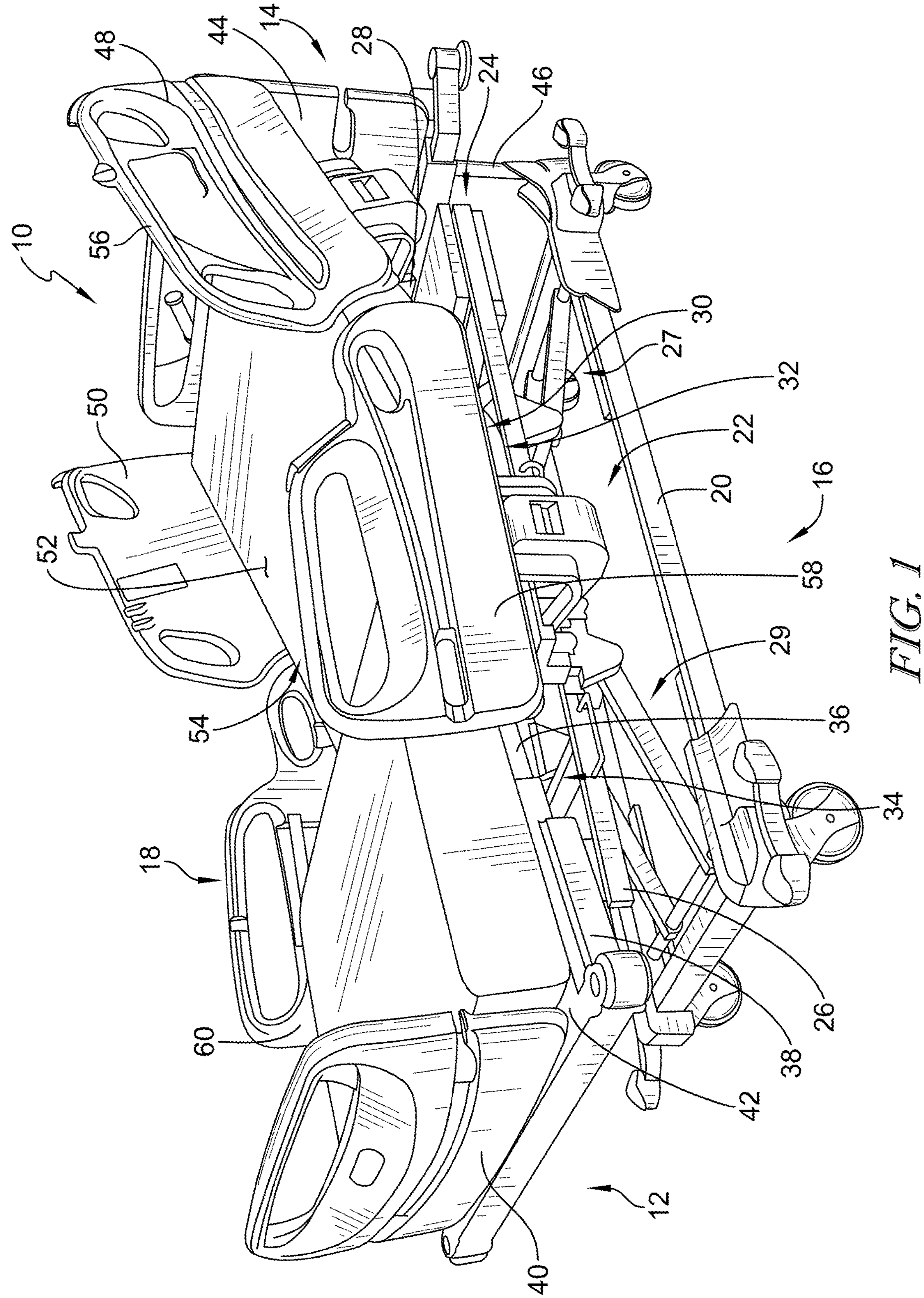
FIG. 1 is a perspective view of a patient support apparatus that includes a bed frame and a mattress supported on the bed frame.

Referring to FIG. 1, a patient support apparatus 10 is illustratively embodied as a hospital bed 10. The view shown in FIG. 1 is generally taken from a position that is oriented at the left side, foot end of the hospital bed 10. For purposes of orientation, the discussion of the hospital bed 10 will be based on the orientation of a patient supported on the hospital bed 10 in a supine position. Thus, the foot end 12 of the hospital bed 10 refers to the end nearest the patient's feet when the patient is supported on the hospital bed 10 in the supine position. The hospital bed 10 has a head end 14 opposite the foot end 12. A left side 16 refers to the patient's left when the patient is lying in the hospital bed 10 in a supine position. The right side 18 refers to the patient's right. When reference is made to the longitudinal length of the hospital bed 10, it refers a direction that is represented by the lines that generally extend between the head end 14 and foot end 12 of the hospital bed 10. Similarly, lateral width of the hospital bed 10 refers to a direction that is represented by the lines that generally extend between the left side 16 and right side 18.

The hospital bed 10 includes a base frame 20 which supports a lift system 22. The lift system 22 engages the base and an upper frame 24 such that the lift system 22 moves the upper frame 24 vertically relative to the base frame 20. The lift system 22 includes a head end linkage 27 and a foot end linkage 29. Each of the linkages 27 and 29 are independently operable and may be operated to cause the hospital bed 10 to move into a tilt position which is when the head end 14 of the upper frame 24 is positioned lower than the foot end 12 of the upper frame 24. The hospital bed 10 may also be moved to a reverse tilt position with the foot end 12 of the upper frame 24 is positioned lower than the head end 14 of the upper frame 24.

The upper frame 24 supports a load frame 26. The load frame 26 supports a head deck 28 which is movable relative to the load frame 26. The load frame 26 also supports an articulated seat deck 30, also movable relative to the load frame 26 and a fixed seat deck 32. Also supported from the load frame 26 is a foot deck 34 that is articulated and moveable relative to the load frame 26. The foot deck 34 in the illustrative embodiment of FIG. 1 provides for powered pivoting of the foot deck 34 and manual extension and retraction of the foot deck 34 to vary the length of the foot deck 34. In other embodiments, powered pivoting of the foot deck 34 may be omitted and the related movement may be caused manually, or follow movement of the articulated seat deck 30. In addition, in some embodiments, extension and retraction of the foot deck 34 may be powered by an actuator.

The foot deck 34 includes a first portion 36 and a second portion 38, which moves relative to the first portion 36 to vary the size of the foot deck 34. The second portion 38 moves generally longitudinally relative to the first portion 36 to vary the longitudinal length of the foot deck 34 and, thereby, the longitudinal length of the hospital bed 10.

A foot panel 40 is supported from the second portion 38 and extends vertically from an upper surface 42 of the second portion 38 to form a barrier at the foot end 12 of the hospital bed 10. A head panel 44 is positioned on an upright structure 46 of the base frame 20 and extends vertically to form a barrier at the head end 14 of the hospital bed 10. A left head siderail 48 is supported from the head deck 28 and is moveable between a raised position shown in FIG. 1 and a lowered position as is known in the art. A right head siderail 50 is also moveable between the raised position of FIG. 1 and lowered position. As shown in FIG. 1, in the raised position, the siderails 48 and 50 extend above an upper surface 52 of a mattress 54 of the hospital bed 10 when the siderails 48 and 50 are in a raised position. In a lowered position an upper edge 56 of the left head siderail 48 is below the upper surface 52.

The hospital bed 10 also includes a left foot siderail 58 and a right foot siderail 60, each of which is supported directly from the load frame 26. Each of the siderails 48, 50, 58, and 60 are operable to be lowered to a position below the upper surface 52. It should be noted that when the head deck 28 is moved, the head siderails 48 and 50 move with the head deck 28 so that they maintain their relative position to the patient. This is because both of the head siderails 48 and 50 are supported by the head deck 28.

Figure 2:
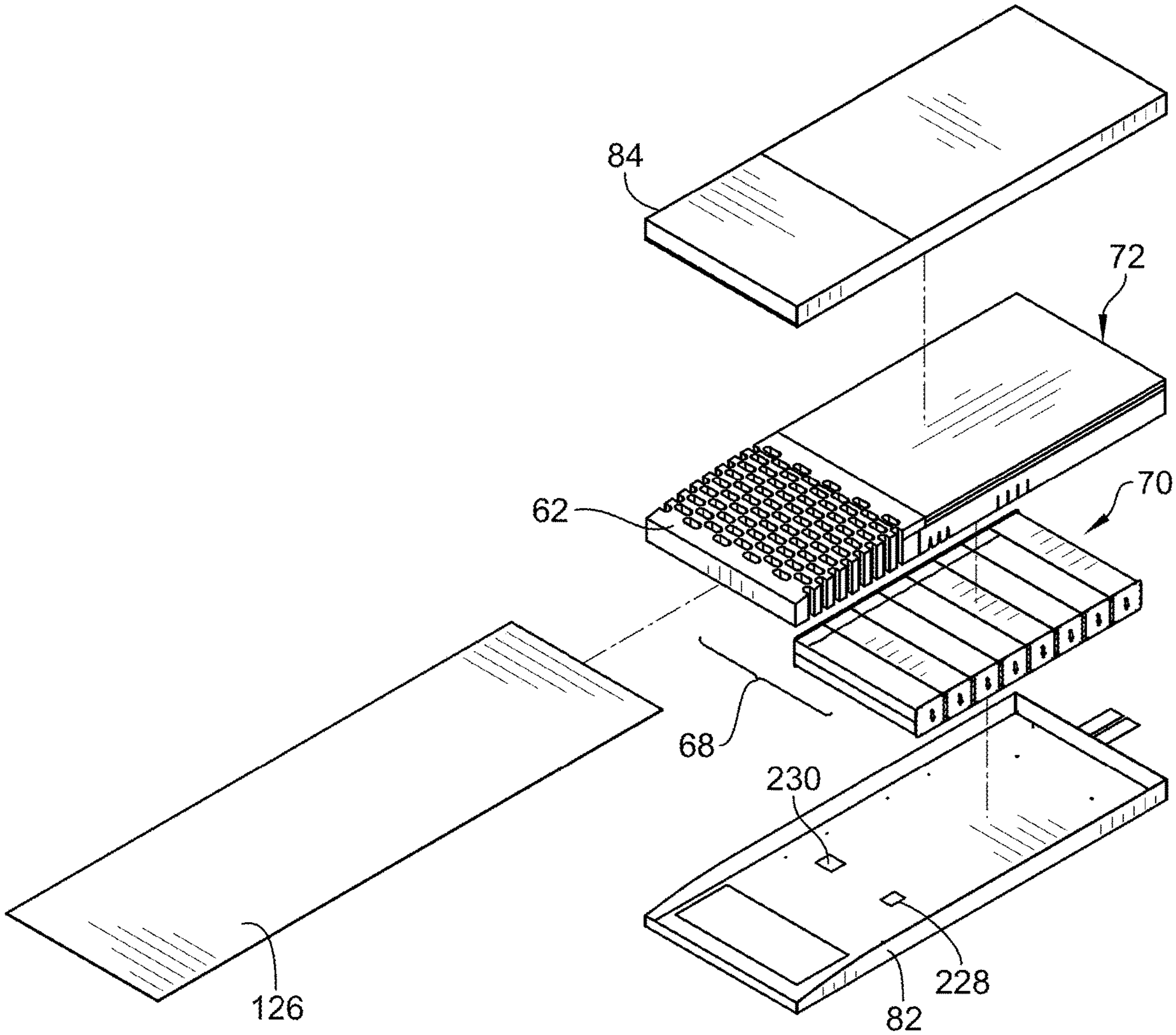
FIG. 2 is an exploded assembly view of the major components of the mattress of FIG. 1.
Figure 3:
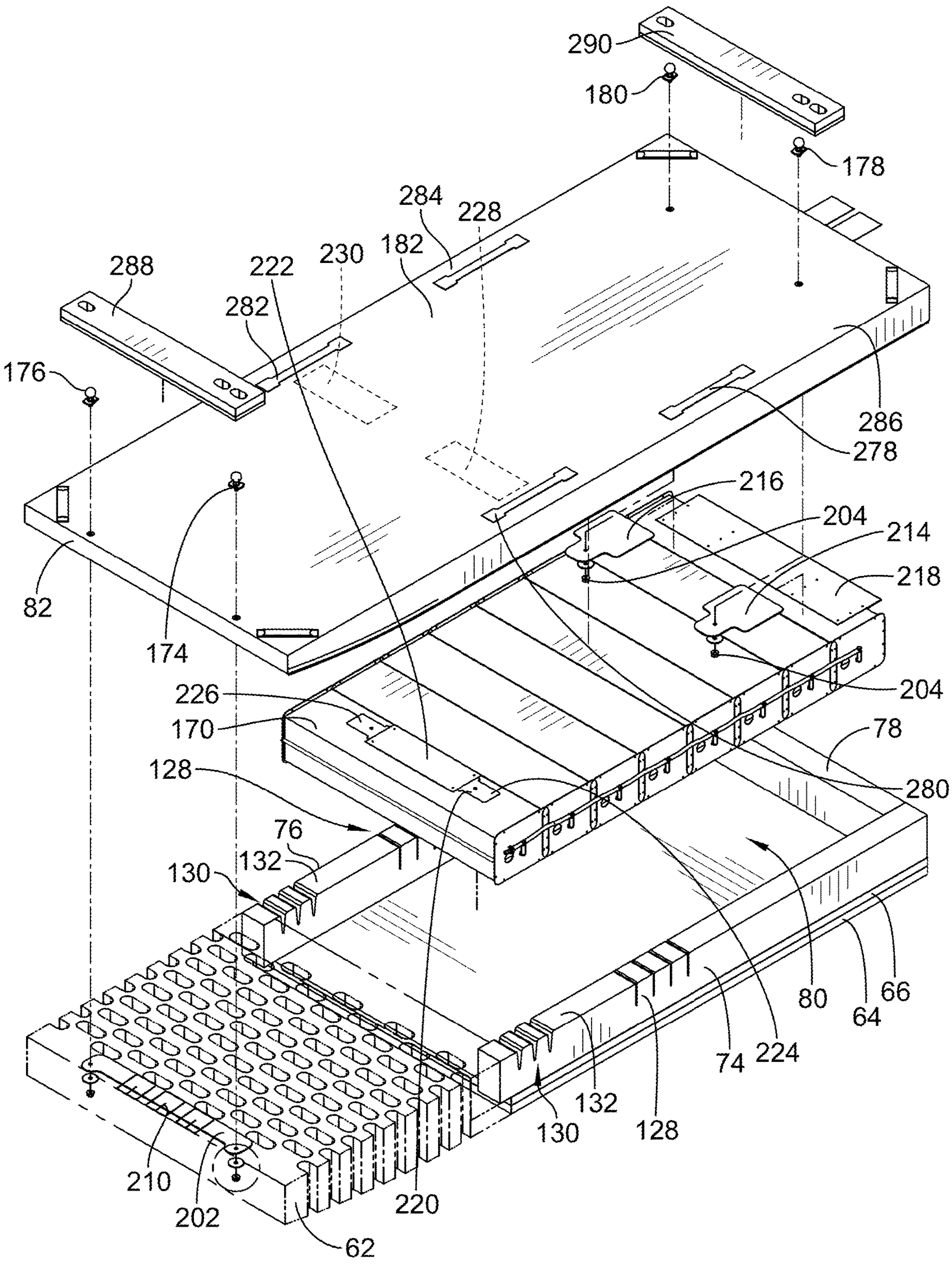
FIG. 3 is a detailed exploded assembly view of the mattress of FIG. 1 with portions omitted, the matter being inverted in FIG. 3 and illustrating the manner in which the components of the mattress are secured together to control movement of the mattress components during movement of various members of the bed frame.

Referring to FIGS. 2 and 3, the mattress 54 includes a core 68 which comprises a bladder assembly 70 which engages a foam frame 72. The foam frame 72 includes a perforated foot support 62 which is coupled to a pair of longitudinal bolsters 74 and 76. The longitudinal bolsters 74, 76 are interconnected by a header 78 which extends laterally between the bolsters 74, 76 at the head end 14 of the mattress 54. The core 68 also includes an upper layer of foam 64 and a lower layer of foam 66 which are glued together to form an upper foam support 65. The longitudinal bolsters 74 and 76 are secured to the perforated foot support 62 such that the foot support 62, bolsters 74 and 76, header 78, and foam support 65 cooperate to define a space 80 into which the bladder assembly 70 is positioned to form the core 68. The mattress 54 includes a lower cover 82 and an upper cover 84 which are secured together with a zipper as is known in the art. The mattress 54 further includes a fire barrier assembly 126 which is wrapped over the top of core 68 to fully enclose the core 68 in the fire barrier assembly 126.

Figure 5:
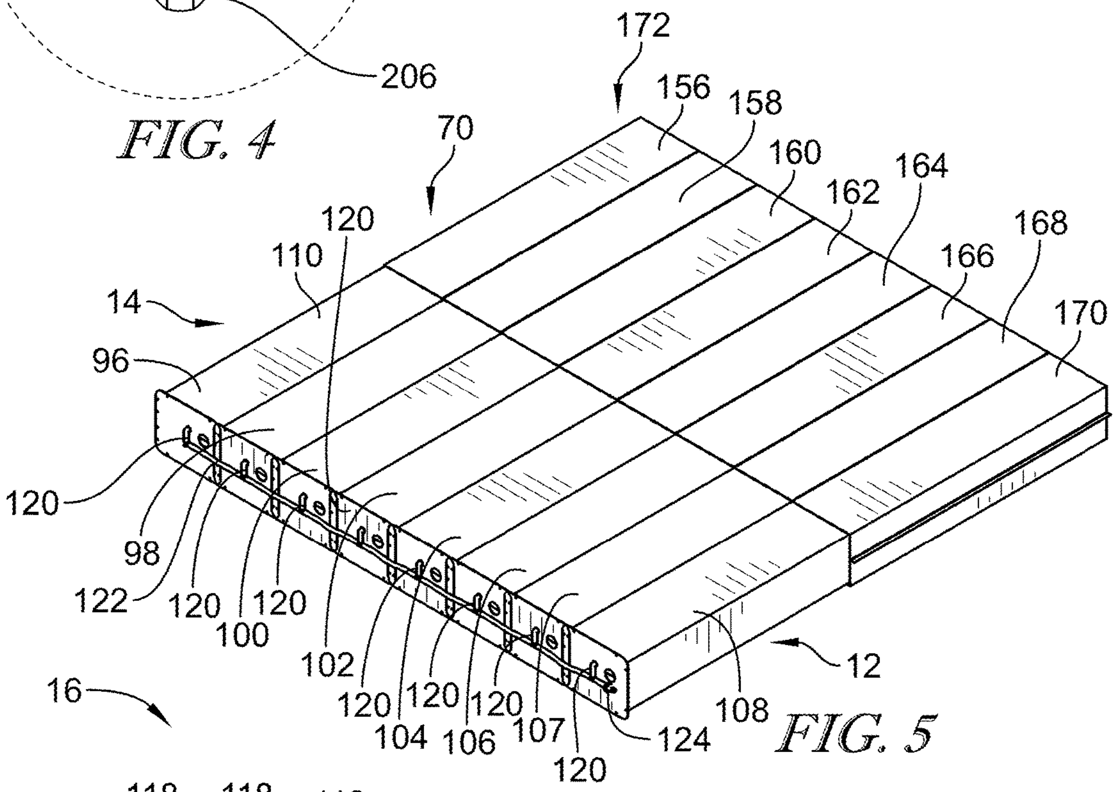
FIG. 5 is and assembly view of a bladder assembly of the mattress of FIG. 1.
Figure 6:
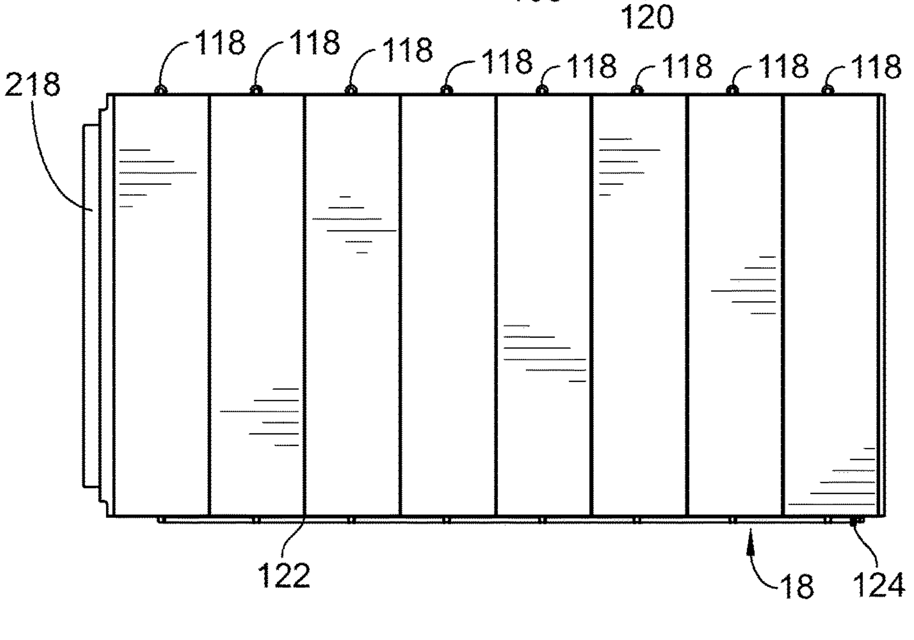
FIG. 6 is a top plan view of the bladder assembly of FIG. 5.
Figure 10:
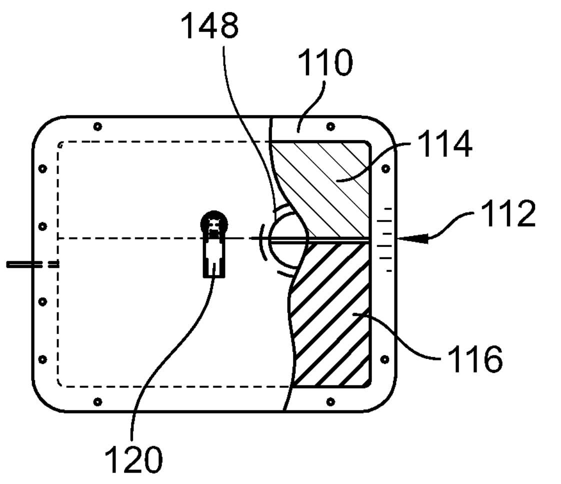
FIG. 10 is a side view of a bladder of the bladder assembly of FIG. 5 with portions cut-away to show a foam structure within the bladder.
Figure 11:
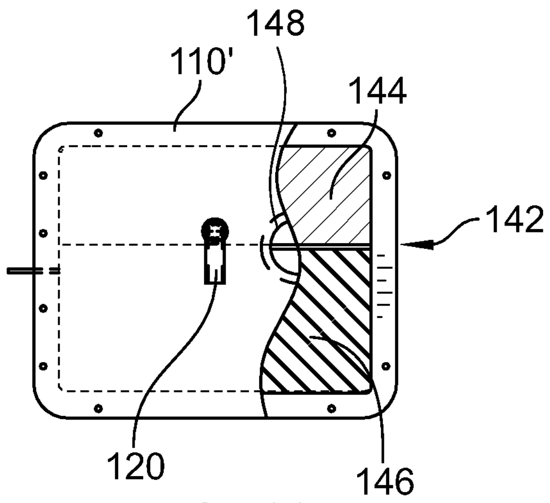
FIG. 11 is a side view of another bladder of the bladder assembly of FIG. 5 with portions cut-away to show a foam structure within the bladder, the foam structure of FIG. 11 being different than the foam structure of FIG. 10.
Figure 12:
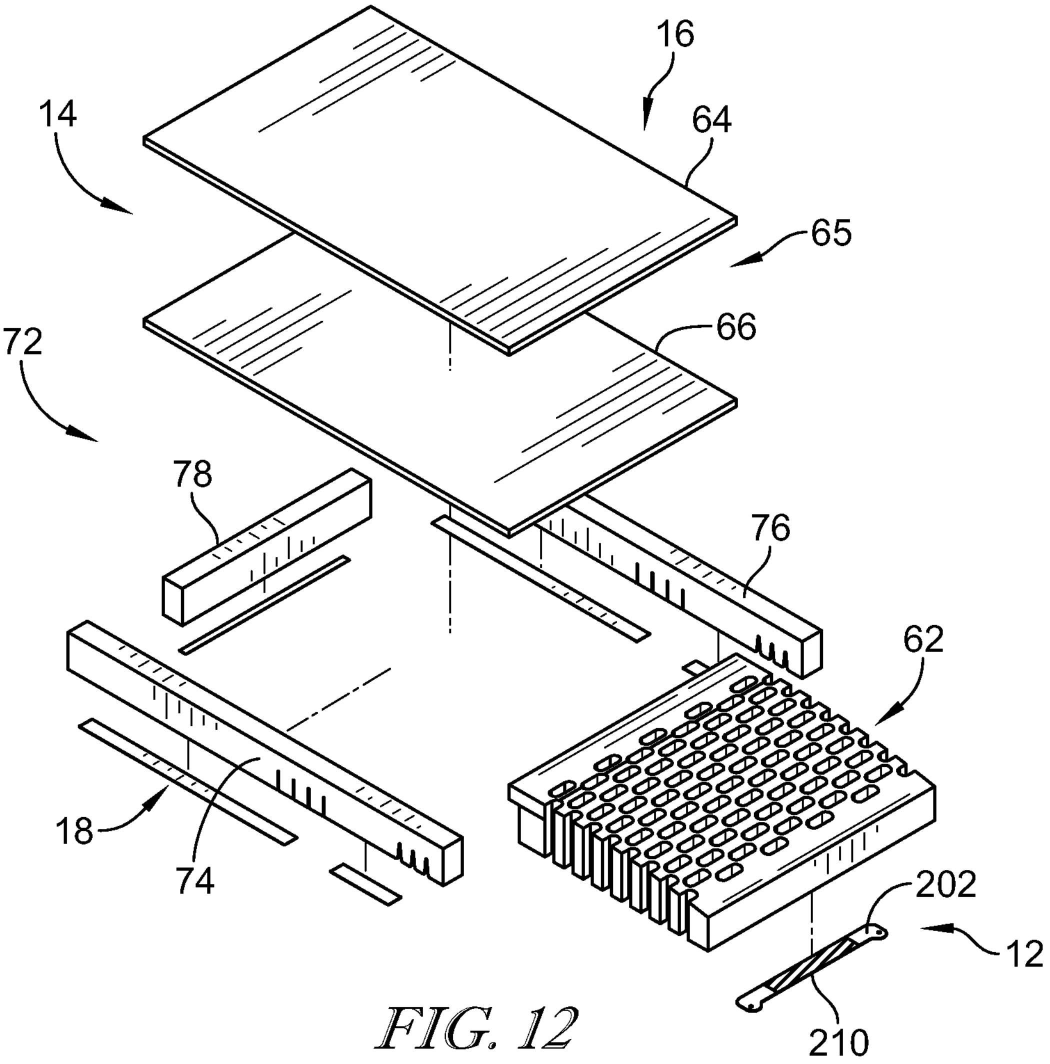
FIG. 12 is an exploded assembly view of a foam frame of the mattress of FIG. 1.
Figure 13:
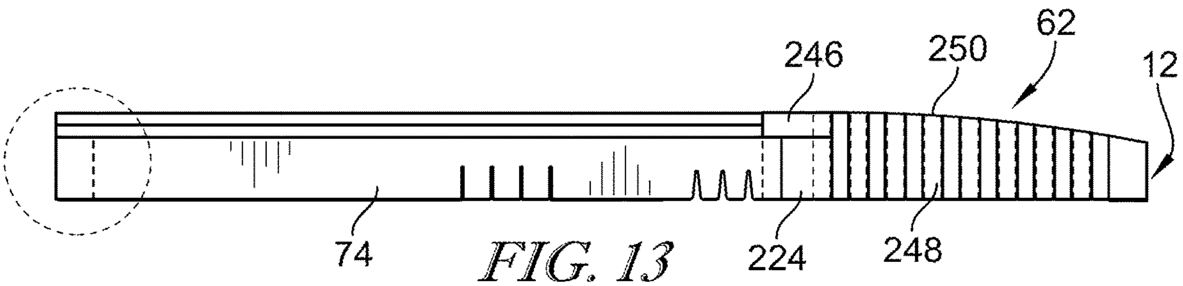
FIG. 13 is a right side view of a core of the mattress of FIG. 1.

As shown in FIGS. 5 and 6, the bladder assembly 70 includes eight bladders 96, 98, 100, 102, 104, 106, 107, and 108. The bladders are arranged with bladder 108 positioned at the foot end 12 of the bladder assembly 70 and bladder 96 positioned at the head end 14. Each bladder 96, 98, 100, 102, 104, 106, 107, and 108 comprises an outer enclosure 110 of urethane coated nylon which provides an air impermeable enclosure. As seen in FIGS. 10 and 11, inside of each enclosure 110 is a two layered foam structure. In FIG. 10, the foam structure 112 includes an upper layer 114 and a lower layer 116. The foam layers 114 and 116 are glued together. The foam structure 112 is deformable under load, but resiliently expands to fill the interior space of the enclosure 110. Similarly, referring to FIG. 11, a different foam structure 142 includes an upper layer 144 glued to a lower layer 146. The foam materials used in layers 144 and 146 differs from the layers 114 and 146 so that the foam structures 142 and 112 have different performance characteristics. In the illustrative embodiment, the bladders 96, 98, and 100 include the foam structure 112 while the bladders 102, 104, 106, 107, and 108 include the foam structure 142. These differences provide for different support for the head portion of the bladder assembly 70, including bladders 96, 98, and 100, as compared to the torso portion of the bladder assembly 70, which includes bladders 102, 104, 106, 107, and 108.

Figure 7:
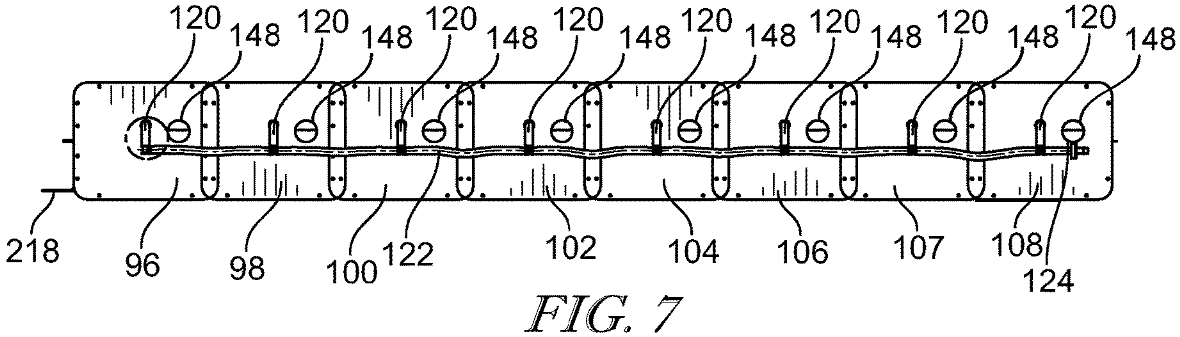
FIG. 7 is right side view of the bladder assembly of FIG. 5.
Figure 8:
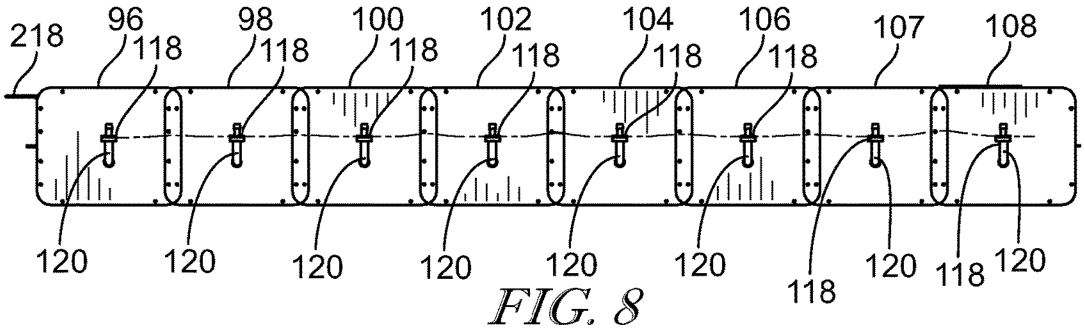
FIG. 8 is a left side view of the bladder assembly of FIG. 5, the bladder assembly being inverted in FIG. 8.
Figure 9:
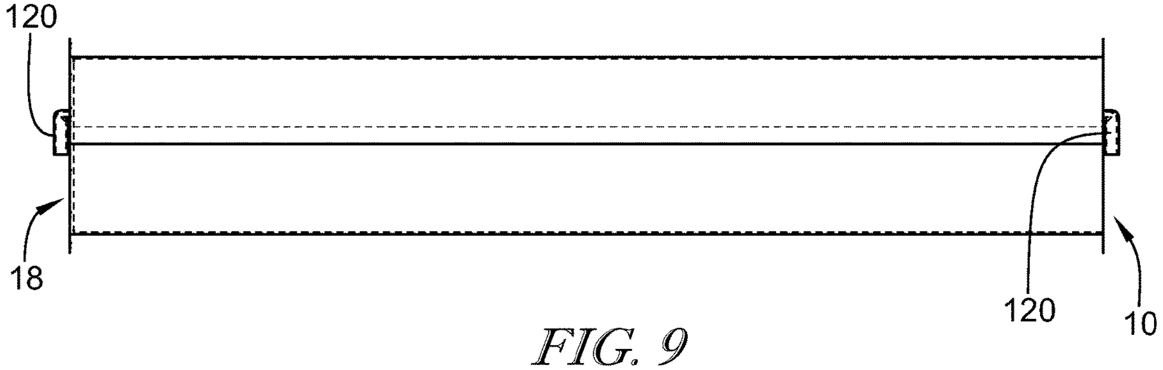
FIG. 9 is a plan view of a bladder of the bladder assembly of FIG. 5.

Referring to FIGS. 7, 10, and 11, each of the enclosures 110 is formed to include a transparent window 148 formed in wall 150 of the enclosure 110. The window 148 is positioned to overlie the interface between layers 114 and 116 or layers 144 and 146 so that a user may see the material within the enclosure 110. This allows a user to distinguish the contents of the enclosure 110 to determine which of the foam structures 112 or 142 is included in the enclosure 110. In the illustrative embodiment, at least one of the upper layers 114 or 144, or one of the lower layers 116 or 146 is a different color. Thus, by comparing the colors visible through the window 148, an assembler can identify the characteristics of the particular enclosure 110 to determine whether the particular bladder should be positioned in the head portion as one of the bladders 96, 98, and 100 or the torso portion as one of the bladders 102, 104, 106, 107, and 108.

At the left side 16 of each enclosure 110 is a pressure relief or check valve 118. Each of the check valves 118 are configured to open when the pressure applied to the valve exceeds the relief pressure of the valve 118. In the arrangement of the bladder assembly 70, the valves 118 are arranged such that when the pressure inside any one of the enclosures 110 is lower than the pressure of atmosphere, the corresponding valve 118 opens to permit air to flow from atmosphere into the respective enclosure 110.

On the right side 18 of the bladder assembly 70, each enclosure 110 includes a respective outlet 120. Each of the outlets 120 are connected to a manifold tube 122 so that the enclosures 110 are all in fluid communication with one another through the outlets 120 and manifold tube 122. The manifold tube 122 terminates with a pressure check valve 124. The pressure check valve 124 is configured such that when the pressure in the manifold tube exceeds a relief pressure of the check valve 124, the check valve 124 opens to permit the venting of the pressure to atmosphere. It should be understood that the valves 118, being check valves, do not permit a flow of air from the enclosures 110 through the valves 118 to atmosphere. The only flow path for air from the enclosures to atmosphere is through the manifold tube 122 and pressure check valve 124. Similarly, the only path for that flow into any of the enclosures 110 is through a respective valve 118.

Thus, the mattress 54 is self-adjusting to maintain the pressure within each of the bladders 96, 98, 100, 102, 104,

106, 107, and 108 to a pressure below the relief pressure of the check valve 124. The operation of the inlet valves 118 of any particular bladder 96, 98, 100, 102, 104, 106, 107, and 108, which is unloaded, provides for the rapid filling of the respective bladder 96, 98, 100, 102, 104, 106, 107, and 108 with air from atmosphere. This approach helps to regulate the pressure within the various bladders 96, 98, 100, 102, 104, 106, 107, and 108 relatively quickly to control the support pressure experienced by a patient.

In the event that the patient exceeds the weight which can be supported by the bladder assembly 70 pneumatically, venting of the pressure in the manifold tube 122 and pressure check valve 124 permits the patient to be supported on the foam structures 112 of each bladder 96, 98, 100, 102, 104, 106, 107, and 108. In this way, the mattress 54 provides the benefits of a pneumatic mattress with safety for larger patients from bottoming out against the surface of the decks of the hospital bed 10. It should be understood that the foam structures 112 also serve the purpose of expanding the enclosures 110 to create the vacuum which draws air through the valves 118 when a particular bladder 96, 98, 100, 102, 104, 106, 107, and 108 is unloaded.

In the illustrative embodiment of FIG. 10, foam structures 112 and 142 have similar constructions. However, in some embodiments the layers 114, 116 or 144, 146 of the foam structures 112 and 142, respectively, may have different properties in different bladders 96, 98, 100, 102, 104, 106, 107, and 108. In addition, the foam structures 112, 142 may be a single layer, or may include more than two layers in some embodiments.

Because the bed 10 has compound articulation of several members, including the movement of portion 38 relative to portion 36 of deck 34, the mattress 54 includes several adaptations that make the mattress 54 suitable for use with the compound articulations. For example, each of the longitudinal bolsters 74, 76 are formed to include a series of relief slits 128 positioned at the location in the longitudinal bolsters 74, 76 which are positioned at the intersection of the head deck 28 and the articulated seat deck 30. The relief slits 128 provide for expansion of the longitudinal bolsters 74, 76 when the head deck 28 is raised. With the relief slits 128, little material is removed, but the foam is permitted to expand at the location of the slits 128. In contrast, a series of cutouts 130 are positioned at the interface between the articulated seat deck 30 and the foot deck 34. The cutouts 130 are generally triangular with more material removed at a lower surface 132 of the longitudinal bolsters 74, 76, the cutouts 130 becoming narrower to a termination spaced apart from the lower surface 132. The cutouts 130 provide for both expansion and collapsing of the length of the longitudinal bolsters 74, 76 at the interface between the articulated seat deck 30 and the foot deck 34. The removed material at the surface 132 permits the cutouts 130 to collapse when the foot deck 34 is moved downwardly relative to the articulated seat deck 30 such that the material of the longitudinal bolsters 74, 76 does not bulge.

The bladders 96, 98, 100, 102, 104, 106, 107, and 108 are each positioned in a respective sleeve 156, 158, 160, 162, 164, 166, 168, and 170 of a cover 172. The cover 172 is formed of a fabric that is sewn to form the sleeves 156, 158, 160, 162, 164, 166, 168, and 170 as a unitary structure so that the bladders 96, 98, 100, 102, 104, 106, 107, and 108 are permitted some relative movement, but the cover 172 maintains the relationship between the bladders 96, 98, 100, 102, 104, 106, 107, and 108 during compound articulation of the frame and deck members of the bed 10. This prevents the bladders 96, 98, 100, 102, 104, 106, 107, and 108 from becoming dislodged and maintains an appropriate orientation.

Figure 17:
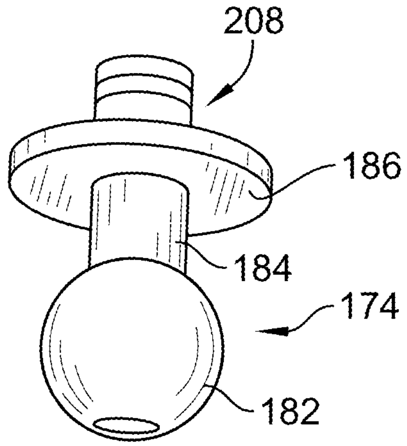
FIG. 17 is a perspective view of a knob that extends from a bottom cover of the mattress of FIG. 1, the knob being configured to engage openings in deck members of the bed frame.
Figure 18:
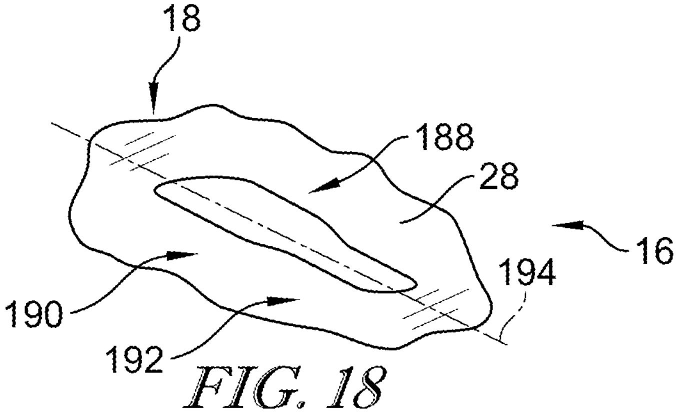
FIG. 18 is an illustration of an opening formed in a head deck of the bed frame of FIG. 1, the opening configured to receive the knob of FIG. 17.
Figure 19:
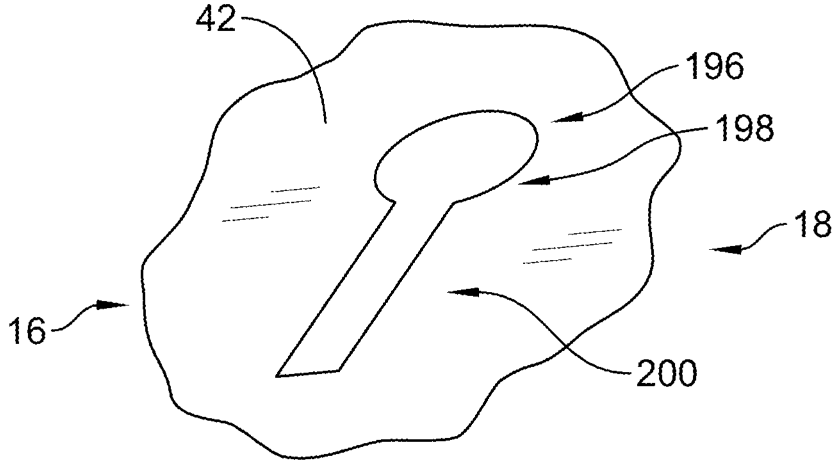
FIG. 19 is an illustration of an opening formed in a foot deck of the bed frame of FIG. 1, the opening configured to receive the knob of FIG. 17.

To control movement of the mattress 54 relative to the moveable members of the bed 10, four knobs 174, 176, 178, and 180 extend from a bottom surface 182 of the lower cover 82 as shown in FIG. 3. The knobs 174, 176, 178, and 180 are similarly arranged and details of knob 174 are shown in FIG. 17 and the knob 174 includes a spherical body 182 that is coupled to a stem 184 that extends from a base 186. The head deck 28 is formed to include a slotted opening 188 as shown in FIG. 18. The slotted opening 188 is formed with a key-hole effect so that a wider portion 190 narrows to a thin portion 192. The slotted opening 188 has a longitudinal axis 194 that extends laterally on the deck 28 with the slotted opening positioned with the wider portion positioned on the outboard side of the deck 28. A second slotted opening that is a mirror image of the slotted opening 188 is positioned on the opposite outboard side of the deck so that the knob 178 is positioned in the slotted opening 188 and the knob 180 is positioned in the mirror image slot. The natural tendency is to have the knobs 178 and 188 to be urged into the narrow portion 192 of each of the slotted openings. Another configuration of key-hole opening 196 is positioned in the second portion 38 of deck 34 through the surface 42 as shown in FIG. 19. A circular opening 198 is positioned nearer the foot end 12 of the second portion 38 and the knobs 174 and 176 are each received in a circular opening 198 of a respective key-hole opening 196 so that the stem 184 is urged into a slot 200. When the knobs 174, 176, 178, and 180 are engaged with the deck 28 and deck 34 respectively, movement of the decks 28, 30, and 34 are transferred directly to the mattress 54 such that the mattress 54 moves with the decks 28, 30, and 34.

Figure 4:
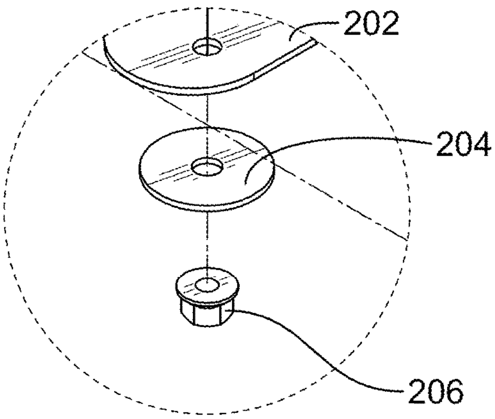
FIG. 4 is an enlarged view of the portion of FIG. 3 enclosed in a circle.
Figure 14:
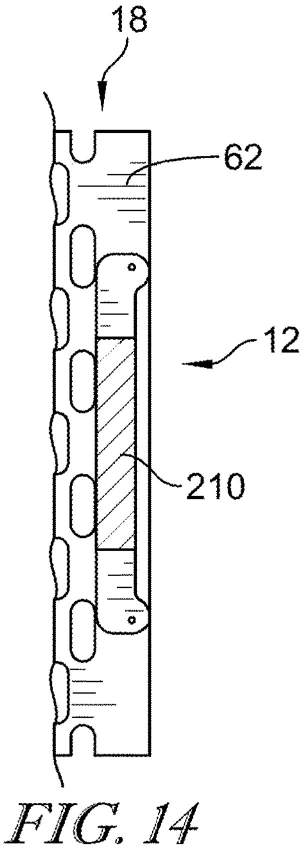
FIG. 14 is a top plan view of a portion of a perforated foot section of the foam frame of the mattress of FIG. 1.

The knobs 174 and 176 are secured to a plate 202, seen in FIG. 3, that is glued to the foot end 12 of the perforated foot support 62 by a nut 204 and washer 206 (seen in FIG. 4) with the nut 204 being received on a threaded stem 208 of the knobs 174 and 176. The plate 202 is positioned in a sleeve 210 (seen in FIG. 14) that is glued to the perforated foot support 62. The plate 202 is free to move in the sleeve 210 in the direction of the arrow 212 as necessary.

The knobs 178 and 180 are secured to respective plates 214 and 216 shown in FIG. 3. The cover 172 is formed to include a flap 218 with the plates 214 and 216 being secured to the flap 218 when the knobs 178 and 180 are secured by the respective nuts 204. The plates 214, 216 and flap 218 cooperate to permit controlled movement of the bladder assembly 70 relative to the lower cover 82. The bladder assembly 70 is further secured to the lower cover 82 by a plate 220 positioned in a sleeve 222 formed on the bottom of sleeve 170 of the cover 172 of the bladder assembly 70. The plate 220 includes two flanges 224, 226 which are received in pockets 228 and 230 respectively. The pockets 228 and 230 are formed in the lower cover 82 by welding flaps of material 232, 234 to the upper surface 236 of the lower cover 82. The plate 220 is flexible so that the flanges 224, 226 can be slipped under the flaps 232, 234 into the pockets 228, 230. Thus, the bladder assembly 70 is secured to the lower cover 82 at the head end 14 by the plates 214, 216 and knobs 178, 180 and the foot end 12 of the bladder assembly 70 is secured to the lower cover 82 with the flanges 224, 226 positioned in the pockets 228, 230.

Figure 20:
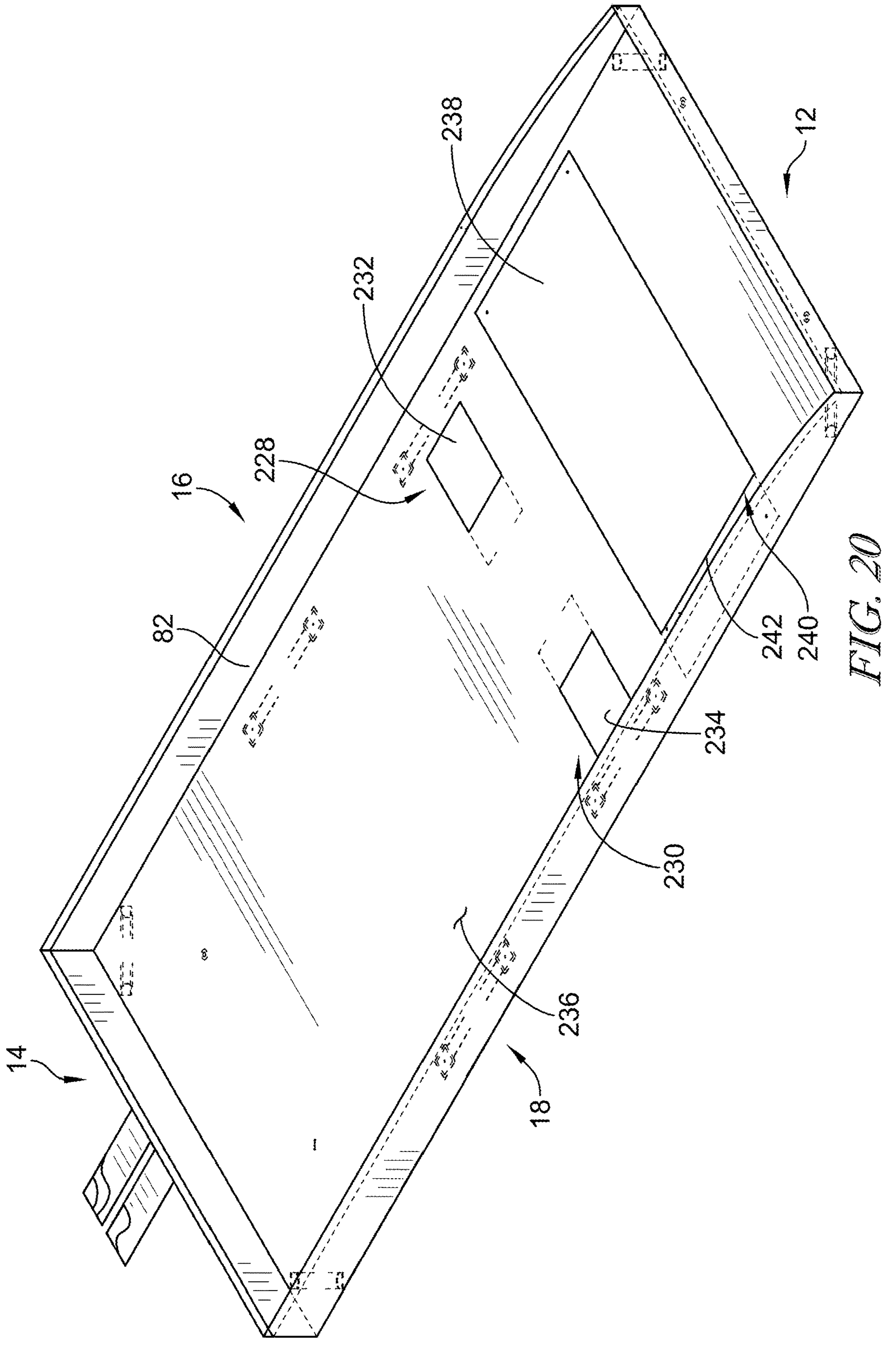
FIG. 20 is a perspective view of the lower cover of the mattress of FIG. 1.

During movement of the decks 28, 30, and 34, the overall mattress 54 is secured by the knobs 174, 176, 178, 180, while the bladder assembly 70 is maintained in position by the flanges 224, 226 positioned in the pockets 228, 230 in cooperation with the plates 214, 216 and knobs 178, 180. The perforated foot section 62 is free to expand and contract relative to the bladder assembly 70 when the second portion 38 of the deck 34 moves relative to the first portion 36. This helps control the location of the perforated foot section 62 and the bladder assembly 70 onto the appropriate portions of the decks 28, 30, 32, and 34. Referring now to FIG. 20, a flap 238 of fabric is welded to the surface 236 of cover 82 so that a pocket 240 is formed in the area of the cover 82 underlying a portion of the perforated foot section 62. The pocket 240 receives a plate 242 that is positioned therein and serves to stiffen the portion of the lower cover 82 that overlies the interface between the first portion 36 and second portion 38 of the deck 34. This prevents bunching of the lower cover 82 during movement interface between the first portion 36 and second portion 38 of the deck 34.

Figure 15:
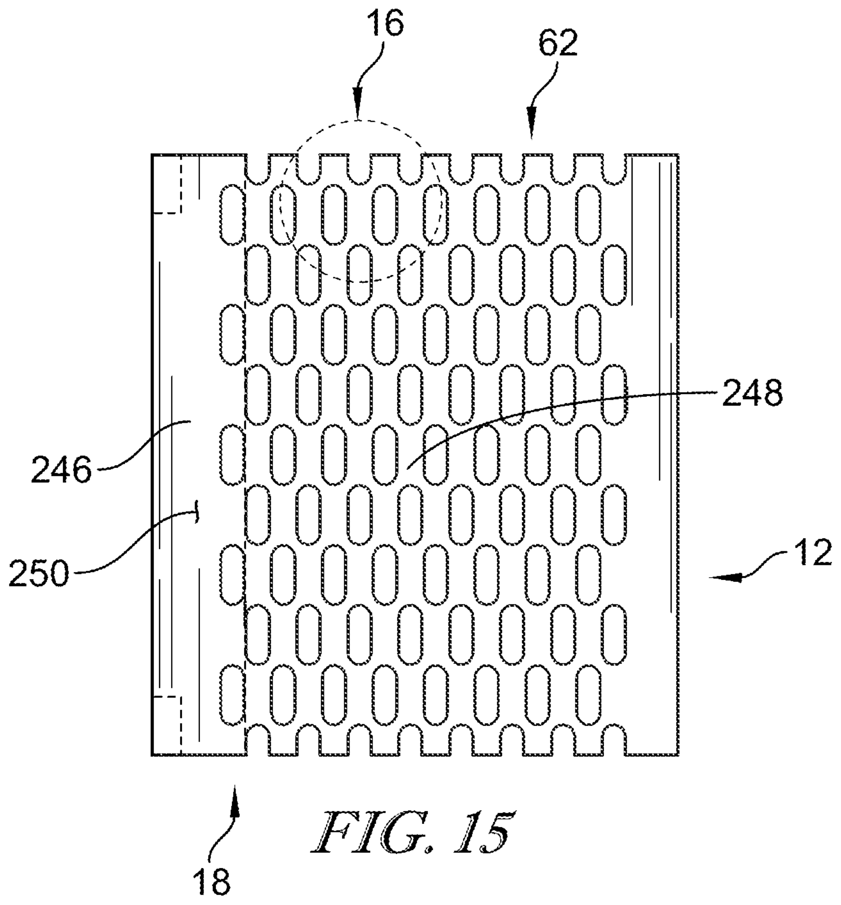
FIG. 15 is a top plan view of the perforated foot section of the foam frame of the mattress of FIG. 1.
Figure 16:
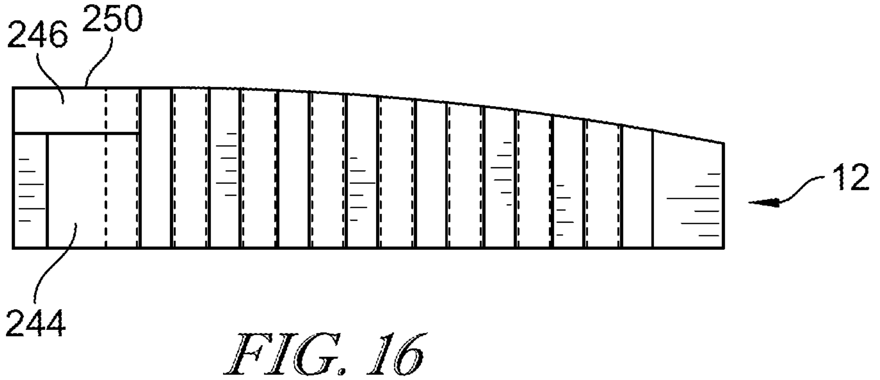
FIG. 16 is a right side view of the perforated foot section of the foam frame of the mattress of FIG. 1.

The relative movement of deck 30 and deck 34, the interface between the perforated foot section 62 and the bladder assembly 70 is subject to being flexed. This flexing must be accommodated without bunching of the foam members at the interface. The perforated foot section 62 comprises relatively soft foam that provides relief to the heels of a patient positioned on the mattress 54. The foam structures 112 and 142 are relatively stiff to provide support for the patient's seat and torso. Referring to FIGS. 15 and 16, to accommodate the transition and limit the feeling of "sinking in" that a patient experiences as they slide toward the foot end 12 of the bed 10 to egress from the bed 10, the perforated foot section 62 is modified to include a foam block 244 that is positioned under a cantilevered member 246 that extends from the perforated body 248 of the perforated foot section 62. The foam block 244 has a density that provides a stiffness that exceeds the stiffness of the material of the body 248 and cantilevered member 246. The foam block 244 is formed with material removed so that the bolsters 74, 76 cooperate with the foam block to form a rabbet joint. The cantilevered member 246 overlaps the bolsters 74, 76 to provide a uniform upper surface 250.

Referring again to FIG. 3, the lower cover 82 includes a number of structures formed on the lower surface 182 including four linen lock straps 270, 272, 274, and 276 positioned at the four corners. The linen lock straps 270, 272, 274, and 276 are a urethane coated nylon fabric that is sewn to a substrate fabric 286 of the lower cover 82 at each end of the respective strap 270, 272, 274, and 276. The straps 270, 272, 274, and 276 are configured to allow a user to tuck a corner of a linen, such as a sheet, for example into the strap 270, 272, 274, or 276 to secure the linen under the mattress 54. Similarly, four handles 278, 280, 282, and 284 are sewn to the substrate and are positioned to allow a user to carry the mattress 54. Two travel guards, 288 and 290 are positionable over the knobs 174, 176 and 178, 180, respectively. The travel guards 288 and 290 comprise foam and are removably secured to the knobs 174, 176 and 178, 180, respectively to cover the knobs 174, 176, 178, and 180 to prevent damage to the knobs 174, 176, 178, and 180 during transport of the mattress 54.

Although this disclosure refers to specific embodiments, it will be understood by those skilled in the art that various changes in form and detail may be made without departing from the subject matter set forth in the accompanying claims.

The invention claimed is:

1. A method of providing a support surface for a patient, the method comprising the steps of:

forming a foam frame defining a space;

positioning a bladder assembly in the space;

enclosing the foam frame and the bladder assembly in a cover, the cover adapted to engage an articulated frame to control movement of portions of the foam frame and the bladder assembly in response to movement of the articulated frame;

securing a first protrusion to the foam frame, the first protrusion extending from a bottom surface of the cover and adapted to be received in a first receiver formed in an articulated frame of a patient support apparatus to secure the foam frame to the articulated frame; and securing a second protrusion to the bladder assembly, the second protrusion extending from the bottom surface of the cover and adapted to be received in a second receiver formed in the articulated frame of the patient support apparatus to secure the bladder assembly to the articulated frame.

2. The method of claim 1, including the step of securing the bladder assembly to the cover at a second location spaced apart from the first and second protrusions.

3. The method of claim 1, including the step of forming the cover to include pockets that receive a portion of the bladder assembly to secure the bladder assembly to the cover at a second location spaced apart from the first and second protrusions.

4. The method of claim 3, wherein the step of forming the bladder assembly includes adding a plate that floats relative to the remainder of the bladder assembly, the plate interconnecting the bladder assembly and cover at the second location.

5. The method of claim 4, wherein the step of forming the bladder assembly includes adding a bladder assembly cover that includes a sleeve formed in the bladder assembly cover and positioning the plate in the sleeve such that it is moveable relative thereto.

6. The method of claim 5, including the step of forming the plate such that it is semi-rigid but sufficiently pliable to be positioned in the pockets.

7. The method of claim 6, wherein the step of forming the bladder assembly includes securing the second protrusion to the bladder assembly cover.

8. The method of claim 1, including the step of connecting the first protrusion to a plate secured to the foam frame.

9. The method of claim 8, including the step of securing the plate to the foam frame by a sleeve such that the plate floats within the sleeve.

10. The method of claim 9, including securing the sleeve to the foam frame by glue.

11. The method of claim 10, wherein the step of forming the foam frame to includes forming a perforated foot section that is variable in length.

12. The method of claim 1, wherein the step of forming the bladder assembly further includes forming the bladder assembly from a plurality of foam-filled bladders, each of the foam filled bladders interconnected in a manifold, the manifold having an unpowered relief valve configured to release air from the bladder assembly if the pressure in the bladder assembly exceeds a predetermined limit of the relief valve.

13. The method of claim 12, wherein the step of forming the bladder assembly includes forming the foam-filled bladders such that each include a first layer and a second layer.

14. The method of claim 12, wherein the step of forming the bladder assembly includes grouping a first group of the plurality of foam-filled bladders to have a first performance and a second group of foam-filled bladders to have a second performance, different from the first performance, and wherein the difference in performance varies the support for a patient supported on the patient support apparatus between a head portion and a torso portion of the patient support apparatus.

15. The method of claim 12, wherein the step of forming the bladder assembly includes arranging each of the plurality of foam-filled bladders to include an unpowered check valve configured to open and permit atmospheric air to enter the respective bladder if the pressure in the bladder assembly is lower than the pressure of atmospheric air.

16. The method of claim 12, wherein the step of forming the foam frame to includes forming a perforated foot section that is variable in length.

17. The method of claim 12, wherein the step of forming the bladder assembly includes forming the foam-filled bladders to each include a first layer and a second layer, wherein a first group of the plurality of foam-filled bladders has a first performance and a second group of foam-filled bladders has a second performance, different from the first performance.

18. The method of claim 12, wherein the step of forming the bladder assembly includes forming each of the bladders to include a transparent window formed in a wall of an enclosure of the bladder.

19. The method of claim 18, wherein the performance of a particular bladder is color coded and the transparent window is positioned to allow a user to identify the color of the bladder to identify the performance of the particular bladder by associating the color.

20. The method of claim 19, wherein the cover is configured to include pockets that receive a portion of the bladder assembly to secure the bladder assembly to the cover at a second location spaced apart from a protrusion.

* * * * *